United States Patent [19]

Alewitz

[11] 4,060,472
[45] * Nov. 29, 1977

[54] ANODE-FITTING ASSEMBLY

[75] Inventor: Sam Alewitz, Painesville, Ohio

[73] Assignee: Perfection Corporation, Madison, Ohio

[*] Notice: The portion of the term of this patent subsequent to June 24, 1992, has been disclaimed.

[21] Appl. No.: 589,865

[22] Filed: June 24, 1975

Related U.S. Application Data

[63] Continuation-in-part of Ser. No. 310,561, Nov. 29, 1972, Pat. No. 3,891,530.

[51] Int. Cl.² .............................................. C23F 13/00
[52] U.S. Cl. ..................................... 204/197; 204/286
[58] Field of Search .............. 204/147, 148, 196, 197, 204/286, 297 R

[56] References Cited

U.S. PATENT DOCUMENTS

| | | | |
|---|---|---|---|
| 2,740,757 | 4/1956 | Craver | 204/197 |
| 2,748,250 | 5/1956 | Andrus | 204/197 |
| 3,542,663 | 11/1970 | Alewitz | 204/197 |
| 3,660,264 | 5/1972 | Schuller | 204/197 |
| 3,867,274 | 2/1975 | Herman | 204/197 |
| 3,891,530 | 6/1975 | Alewitz | 204/197 |

Primary Examiner—T. Tung
Attorney, Agent, or Firm—Fay & Sharpe

[57] ABSTRACT

An anode-fitting assembly for use in hot water tanks, pipelines or the like wherein an interior metallic surface undergoes corrosion when exposed to electrolytic fluids such as air and water. The fitting element of the assembly is comprised of a hollow nipple or connector member adapted to be threadedly received within an opening of the water tank, pipeline or the like. A tubular intermediate member extends from the nipple. An impervious electrically insulating plastic covering is provided on the exposed external surface of the tubular intermediate member. The anode element is comprised of a cylindrical electrode telescoped within the tubular intermediate member of the fitting and secured thereto by joining means that permits the anode element to be assembled to the fitting element at any convenient time after assembly of the fitting and prior to installation of the anode-fitting assembly in the water tank, pipeline or the like. In the preferred embodiment an impervious fluid passageway is provided within the fitting element such that the anode-fitting assembly may be used as an anode holder and fluid outlet.

8 Claims, 4 Drawing Figures

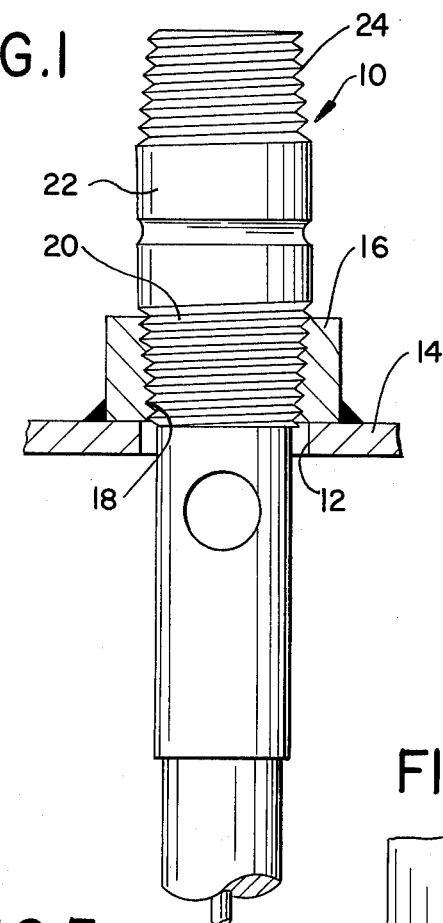
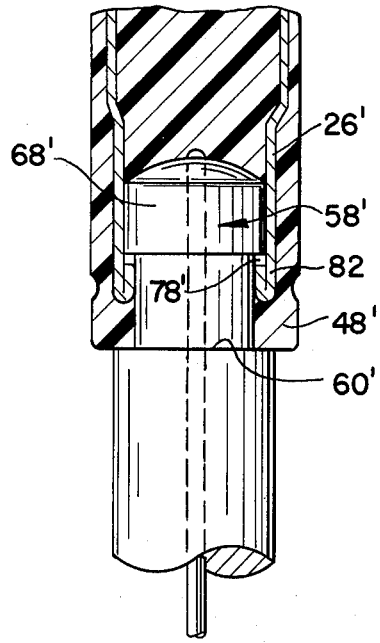
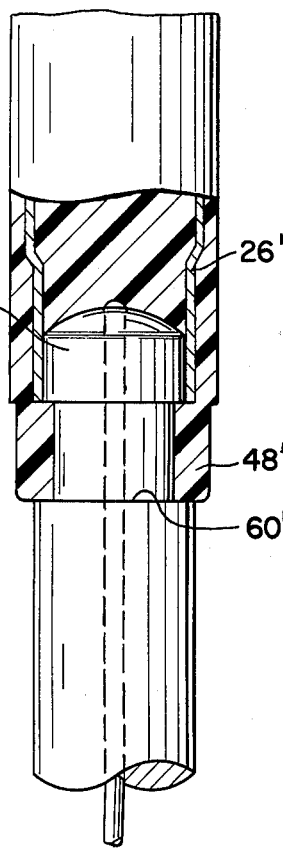
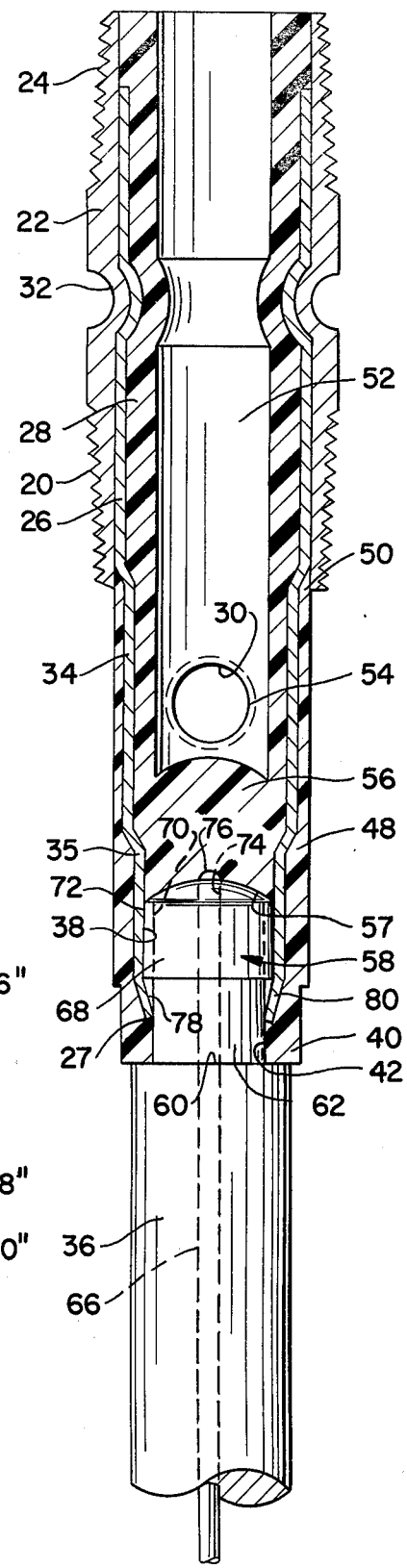

ANODE-FITTING ASSEMBLY

REFERENCE TO RELATED APPLICATION

This application is a continuation-in-part of application Ser. No. 310,561 filed Nov. 29, 1972, now U.S. Pat. No. 3,891,530 issued June 24, 1975.

BACKGROUND OF THE INVENTION

This invention relates to an improved anode-fitting assembly for use in the cathodic protection of metal surfaces such as the internal wall of water heaters, water tanks, pipelines, gas lines, heat exchangers, and the like.

When metals, particularly iron, are exposed to air and water, they undergo corrosion. The corrosion reaction is slow in pure water, but rapid in solutions of electrolytes. The corrosion reaction can be explained as an electrochemical phenomenon. It appears that minute, primary electrical cells are set up when corrosion takes place. When iron is in contact with water containing electrolytes, iron ions immediately go into solution. From a somewhat oversimplifieid point of view, one may imagine that the attractive forces of the electrolyte molecules exceed the cohesive forces which hold the iron ions in their crystalline lattice. Every positive ion which goes into solution leaves one electron behind for each valence which the ion possesses. These electrons tend to collect at the less active portions of the ions (having a lower electrode potential) and combine with hydrogen ions to form hydrogen gas. Several methods of preventing or retarding corrosion have been proposed including alloying iron with certain other elements such as chromium or silicon and application of electrochemistry to produce cathodic protection.

This invention relates to electrochemical protection of iron and other metals through cathodic protection. The primary function of this invention is to provide a galvanic anode-fitting assembly adapted to be introduced into a water heater, pipeline, or the like. The anode element includes an electrode fabricated from a metal that is more active than the metal comprising the water heater, pipeline or the like. The more active metal is electrically connected to the metal to be protected. That difference in activity of the two metals induces a current to flow between them, producing corrosion of the more active metal and furnishing cathodic protection to the iron or less active metal.

DESCRIPTION OF THE PRIOR ART PATENT

In U.S. Pat. No. 3,542,663 to Sam Alewitz and assigned to Perfection Corporation, Madison, Ohio, there is shown and described an anode-fitting combination in which the anode is received within the fitting member during manufacture of the combination and thereafter portions of the external surfaces of the fitting and anode are coated with an impervious electrically insulating plastic covering. Referring specifically to FIG. 3 of U.S. Pat. No. 3,542,663, it will be observed that covering 48 extends below the inner end 27 of the tubular intermediate member 26 and comes into contact with the external surface of electrode 36 thereby completely sealing the inner end 27 of the tubular intermediate member 26 and the upper portion of the electrode from electrolytic fluid. Once the cover 48 has been cast in place the anode-fitting combination as shown in FIG. 3 of U.S. Pat. No. 3,542,663 is then ready for installation in a water heater or other such structure.

From a handling and manufacturing point of view the anode-fitting structure as shown in FIG. 3 of U.S. Pat. No. 3,542,663 has a disadvantage in that the anode or electrode is integrally cast to the fitting at the time the impervious electrically insulating outer covering is put in place about the fitting. Thus, the entire anode-fitting combination as shipped from the point of manufacture is of considerable length due to the fact that the electrode or anode is attached to the fitting. Depending on the specific requirement of the anode-fitting combination, the length thereof may be on the order of 6 feet. The shipping of the anode-fitting combination is considerably more involved than is the shipping of the anode parts or fitting parts separately. Since, however, the water heater manufacturer does not usually have the capability of molding the covering 48 as shown in FIG. 3 of U.S. Pat. No. 3,542,663 (in order to join the electrode to the fitting), the assembly of the anode-fitting combination must be performed by the fitting manufacturer who necessarily must assume the transportation problems discussed above.

A further drawback in the manufacture of the type of structure shown in FIG. 3 of U.S. Pat. No. 3,542,663 is the fact that the anode or electrode member contributes a high proportion of the total cost of the anode-fitting combination. Thus, the fitting manufacturer in assembling a structure such as is shown in FIG. 3 of U.S. Pat. No. 3,542,663 must assume a relatively large inventory of electrodes. The cost of such inventory is considerably in excess of the cost of the individual elements that make up the fitting portion of the anode-fitting combination. Thus, the fitting manufacturer has a considerable investment in electrode material not to mention its investment in plant, equipment, and material relating to the fitting elements themselves.

This invention relates to an anode-fitting assembly in which the anode element may be secured to the fitting element after molding of the fitting element has been accomplished. Thus, the anode-fitting assembly of this invention makes it possible for a water heater manufacturer or other user of anode-fitting assemblies to separately purchase the fitting elements from a fitting manufacturer while selecting anodes from a suitable supplier. The fitting manufacturer may then perform the manufacturing operations necessary to complete assembly of the fitting themselves without the necessity of attaching relatively expensive anodes to the fittings. The anodes may be purchased by the water heater manufacturer and assembled to the fitting members immediately prior to installation of the entire units in water heaters.

DESCRIPTION OF PARENT APPLICATION

In the parent application, Ser. No. 310,561, filed Nov. 29, 1972 (now U.S. Pat. No. 3,891,530 issued June 24, 1975) there is shown and described an anode-fitting assembly in which an essentially cylindrical cap or joining member is received about an end of the electrode. This cap is designed to be received within an essentially cylindrical wall defining a recess in the fitting member such that with the electrode assembled to the fitting the cap is entirely received within the recess and provides an electrical interconnection between the electrode and the fitting member (see FIG. 3).

This invention is an improvement in the joining structure of the electrode and the fitting in that additional retaining means are provided at the joint in order to more securely retain the electrode within the fitting member and to render more difficult the separation of the elements.

BRIEF DESCRIPTION OF THE INVENTION

Briefly described, this invention provides an anode-fitting assembly to protect the metallic surface of a water tank, water heater or the like.

The fitting of the assembly comprises a tubular connector member adapted to be secured to the wall of a water heater in electrical contact therewith and a first fluid passageway defined in said connector member. An intermediate member is secured to the connector member in electrical contact therewith. A second fluid passageway is defined in the intermediate member in communication with the first fluid passageway. A third fluid passageway provides communication from the exterior surface of the intermediate member to the second fluid passageway of the intermediate member. Impervious electrically insulating lining means is provided in said first, second, and third passageways. Similarly, impervious electrically insulating covering means is provided on the exterior surface of the intermediate member.

In the preferred embodiment the anode element is connected to the fitting element by means of a generally cup-shaped joining member received about one end of the anode in electrical contact therewith. The outer surface of the joining member is essentially cylindrical and is press fitted into one end of the intermediate member of the fitting element in electrical contact therewith. When the electrode or anode is provided with a core wire, one end of the core wire is welded or otherwise firmly attached to the joining member in electrical contact therewith.

At the electrode end adjacent the joining member there is defined a recess generally annular in shape. After assembly of the anode to the fitting a portion of the fitting is caused to be deformed into the recess in order to more firmly lock and retain the anode in place.

In a modification of the preferred embodiment, a specially configured portion of the fitting is caused to be displaced into the recess. In a further modification of the preferred embodiment the impervious electrically insulating covering means at the exterior of the fitting is caused to be displaced such that at least a portion of such covering means is received within said recess.

DESCRIPTION OF THE INVENTION

A more complete description of the invention will now be made with reference to the attached drawings in which:

FIG. 1 is an elevational view, partly in cross section, and showing the preferred embodiment of the anode-fitting assembly of this invention secured to the top wall of a water heater;

FIG. 2 is a cross-sectional view of the preferred embodiment of the anode-fitting assembly of this invention;

FIG. 3 is a partial cross-sectional view of a modification of the joint between the anode and fitting members in which a specially configured end of the intermediate member of the fitting is displaced into the recess of the anode; and FIG. 4 is a partial cross-sectional view of a further modification of the joint between the anode and fitting members in which the electrically impervious covering means at the exterior of the fitting is displaced such that at least a portion of such covering means is received within the recess of the anode.

Turning now to FIG. 1, there is shown an anode-fitting assembly 10 according to this invention received within an opening 12 defined within the top wall 14 of a water heater, heat exchanger, pipe line, hot water tank or the like. A spud 16 is welded or otherwise secured to the top wall 14 so as to overlie the opening 12. Internal threads 18 in the spud are adapted to cooperate with external threads 20 of the connector member 22 in order to provide support for the anode-fitting assembly. In the preferred embodiment of this invention, the end of the connector member 22 opposite threads 20 (i.e., the outer end of the connector member 22) is provided with external threads 24 for the attachment of a water line or for alternate purposes to be described more fully hereafter.

The threaded connection between the connector member 22 and the spud 16 of the top wall 14 as shown in FIG. 1 is the commercially acceptable manner of securing a fitting to a water heater. Within the scope of this invention, however, should be considered alternate structures for connecting the connector member 22 to the top wall 14 including weldments, sweat fittings, and the like.

In FIG. 2 there is shown a cross-sectional view of the preferred embodiment of the anode-fitting assembly of this invention. Connector member 22 is defined more specifically as a hollow nipple member including external threads 20 at the inner end thereof and external threads 24 at the outer end thereof. A tubular intermediate member 26 is disposed coaxial with the connector member 22 and is partially telescoped within the inner end of the connector member 22. An impervious, electrically insulating plastic lining 28 is provided within the tubular intermediate member 26 in contact with a portion of both the tubular intermediate member and the connector member and extends from a position flush with the outer end of the connector member 22 well within the tubular intermediate member 26 to a point below the transverse opening 30, as will be more fully described hereafter. The connector member 22 and the tubular intermediate member 26 are firmly locked together in electrical contact by rolling these respective members together by means of a die thus to distort or displace the metal of the connector member 22 thereby to produce an inwardly extending annular rib or corrugation 32. Lining 28 is similarly indented as it is disposed in contact with the internal wall of the tubular intermediate member 26 at rib 32. For a more complete description of the locking means producing the annular rib 32 reference is made to the Jacobson U.S. Pat. No. 3,093,161 and assigned to Perfection Corporation, Madison, Ohio.

At a point slightly below the inner end of the connector member 22 the tubular intermediate member 26 is reduced at 34 for a purpose to be described more fully hereafter. The tubular intermediate member is further reduced at 35 where there is defined a generally cylindrical inner wall 38.

Attention is now directed to the exterior surface of the tubular intermediate member 26 wherein a non-metallic, impervious, electrically insulating plastic covering 48 is provided for the purpose of rendering the external surface of the tubular intermediate member 26 electrically insulated and impervious to electrolytic fluids thus retarding or prohibiting altogether the corrosion of the tubular intermediate member 26. To this end, a casting is made about the external surface of the tubular intermediate member 26 thereby defining a generally annular impervious electrically insulating covering 48. From FIG. 2 it will be noted that covering 48 fills the free space adjacent the reduced portion 34, 35. Covering 48 further extends below the inner end 27 of the tubular intermediate member 26 thereby completely sealing such inner end from electrolytic fluid. Covering 48 extends upwardly into contact with the connector member 22 where the reduced portion 34 permits a small amount of plastic material to collect behind the connector member 22 as flash 50. It has been found that by providing a small amount of flash 50 behind the inner end of the connector member 22, a seal is thus defined at the inner end of the connector member 22 preventing entry of electrolytic fluid at the interface of the members 22 and 26, thus preventing localized corrosion at the area of joinder of the connector member and the tubular intermediate member. This seal is particularly enhanced by the taper of the pipe thread 20 of connector member 22 which taper causes the threads to be squeezed radially inwardly into flash 50.

Turning now to the lower portion of covering 48 as shown in FIG. 2, it will be observed that there is provided a shoulder 40 defining a generally cylindrical inner wall 42 which, upon makeup of the fitting, is in engagement with the external surface of the anode as will be described below.

In the embodiment of FIG. 2 a transverse opening 30 is defined in the assembly for purpose of permitting entry of water from the hot water tank into the passageway 52 (defined within the connector member 22 and the tubular intermediate member 26) and thereafter to a suitable discharge pipeline. As shown in FIG. 2, transverse opening 30 extends completely through the covering 48, tubular intermediate member 26 and lining 28. Depending upon the volume of discharge required, one or several transverse openings 30 may be defined in the assembly. At the same time that the covering 48 is cast in place, a core is inserted in the transverse opening of the tubular intermediate member in order to permit a small amount of plastic material to flow about the wall defining the transverse opening thus providing overlapping insulation 54 to cover the metallic walls defining the transverse opening. Thus the tubular intermediate member is rendered completely impervious to electrolytic action and is insulated electrically from electrolytic fluid.

To complete insulation of the interior of the tubular intermediate member 26, a bottom wall 56 of plastic material is defined in the tubular intermediate member at the time the lining 28 is cast in place. Bottom wall 56 and lining 28 thus cooperate to define an impervious interior passageway 52 within the tubular intermediate member 26 and connector member 22 facilitating the flow of fluid from the water tank.

Briefly summarized, the fitting member of the anode-fitting assembly is comprised of the connector member 22, the tubular intermediate member 26, and the lining 28, covering 48, and bottom wall 56 cast in place.

In casting the plastic material a generally cylindrical core element is inserted into the tubular intermediate member closely adjacent the inner wall 38. Other core elements are inserted in the transverse opening of the tubular intermediate member and in the passageway 52. When assembly is completed, the fitting member includes a recess at one end thereof defined by the inner wall 42 of shoulder 40, inner wall 38 of the tubular intermediate member 26 and the bottommost surface 57 of the wall 56. The fitting further includes a lined passageway 52 and a lined transverse opening 30. As will be described more fully hereafter, the anode element is adapted to be received within the recess 58 of the fitting member.

As used in the description of the invention as shown in FIG. 2, the word "fitting" is intended to describe the connector member 22, tubular intermediate member 26 and the lining 28, bottom wall 56 and the associated covering 48. The word "anode" is intended to describe the electrode 36 and the joining member 68. The phrase "anode-fitting assembly" is intended to refer to the combination of the fitting and the anode.

Turning now to the anode element of the assembly, there is shown in FIG. 3 an electrode 36 having a specially configured upper end including a generally transverse shoulder 60 and a reduced generally cylindrical surface portion 62. A core wire 66 extends from the electrode 36.

Adapted to be disposed over the specially configured electrode end is a joining member 68 which, as shown in FIG. 2, is a generally cup-shaped element having substantially cylindrical inner and outer walls 70, 72. The inner wall 60 of joining member 68 (which is shown in phantom in FIG. 2) is adapted to be disposed about the free end of the electrode (i.e., about the reduced surface portion 62) in a press fit relationship. The free end of core wire 66 is adapted to be received in an aperture 74 of the joining member. As is shown in FIG. 2 a spot-weld 76 provides an electrical connection between core wire 66 and joining member 68.

The relationship of joining member 68 to electrode 36 is such that with joining member 68 disposed about the end of the electrode the external wall 72 of the joining member extends outwardly from the plane of the reduced surface portion 62. There is thus defined a generally annular recess 78 between the shoulder 60 and the joining member. Such recess serves to provide additional securing and locking means as will be described more fully below.

Upon assembly of the joining member 68 to the electrode 36, the anode element is ready to be joined to the fitting.

Final assembly of the anode to the fitting is accomplished by disposing the specially configured upper end of the electrode with the attached joining member 68 into the recess 58 of the fitting with the external wall 72 of joining member 68 in a press fit relationship with respect to the inner wall 38 of the tubular intermediate member 26. An axial force is applied to either one or both of the anode and fitting members in order to complete assembly of these members as the joining member is forced into the inner wall 38 of the tubular intermediate member 26 in a press fit relationship.

Thereafter the free end 80 of the tubular intermediate member 26 is caused to be deformed inwardly into the recess 78 by means of a suitable tool or die applied to the external surface of the covering 48. With free end 80 deformed into the position shown in FIG. 2 there is achieved a firm locking of the joining member 68 (and the attached electrode 36) within the recess 38 as it is extremely difficult to withdraw the joining member 68 past the deformed free end.

The application of a force to the fitting in order to provide for the deformation of the free end 80 of tubular intermediate member 26 also causes a movement or displacement of shoulder 40 in a generally radial direction. This movement is such that plastic insulating material is caused to be brought into tight engagement with the electrode as the inner wall 42 is brought into firm contact with the reduced surface portion 62 of the electrode. Thus the operation by which the free end 80 of tubular intermediate member 26 is caused to be deformed into the recess of the anode assembly also serves to enhance sealing of the assembly in the area of joinder of the anode to the fitting.

In fact, sealing of the anode-fitting assembly in the area of joinder is accomplished in several ways. A sealing interface is provided as the shoulder 60 of electrode 36 contacts shoulder 40 of covering 48. This seal is enhanced as a compressive force is exerted against the covering 48 during the manufacturing operation in which the free end 80 of the tubular intermediate member 26 is deformed.

A further sealing relationship exists between the reduced surface portion 62 and the cylindrical inner wall 42 of shoulder 40. This seal is enhanced as a compressive force is exerted against the covering 48 in order to achieve deformation of the free end 80.

The net effect of the seals established in makeup of the assembly as described above is to prohibit the entry of electrolytic fluid into the area of joinder of the anode and the fitting thus extending the life of the assembly.

While in a preferred embodiment as shown in FIG. 2 the free end 80 of the tubular intermediate member 26 makes contact with the reduced surface portion 62 of the electrode 36 it should be noted that within the scope of this invention should be considered a structure in which the degree of deformation imparted to the free end 80 is such that direct contact of the tubular intermediate member with the electrode is avoided. Such a condition may be desirable when, for example, it is deemed advisable to limit electrical contact between the electrode and the tubular intermediate member 26 to the direct press fitted contact of the joining member 68 within the tubular intermediate member 26.

In the preferred embodiment the tubular intermediate member 26 and joining member 68 are fabricated from steel. The electrode 36 is fabricated from magnesium. Polypropylene compound No. 6652 of Hercules Incorporated is used in the manufacture of the non-metallic portions of the fitting. This compound tends to shrink inwardly when applied thus to enhance sealing of the metal surfaces against electrolytic fluid. Other materials such as epoxy, resins, Bakelite, or formaldehyde compounds may be used.

A modification of the preferred embodiment of the invention is shown in FIG. 3. In this modification the free end of the tubular intermediate member 26' is provided with a folded portion 82. When the fitting of FIG. 3 is initially manufactured the folded portion 82 is slightly flared outwardly in order to permit the insertion of the anode end into the recess 58'. Assembly is completed by the application of a die or suitable tool to covering 48' in order to cause the folded portion 82 of tubular intermediate member 26' to be deformed into recess 78' which is defined as a generally annular space between the joining member 68' and shoulder 60'. A slight indentation will be observed in the covering 48' of FIG. 3 which is caused by the application of a suitable die or forming tool to the fitting in order to provide for the movement of folded portion 82 into the recess of the anode. It will be apparent from an inspection of FIG. 3 that, once assembled, the fitting presents a high degree of structural rigidity. Separation of the anode from the fitting is extremely difficult in view of the interference created by the upturned leg of the folded portion 82 of tubular intermediate member 26'.

A still further modification of the invention is shown in FIG. 4 where it will be noted that the locking action previously provided by the end of the tubular intermediate member is now provided by a direct displacement of the plastic covering 48" (by means of a die or other suitable forming tool) into the recess defined between shoulder 60" and joining member 68". It will be noted in FIG. 4 that tubular intermediate member 26" has a generally cylindrical end portion which is adapted to receive the joining member 68". Displacement of a portion of covering 48" creates an interference rendering more difficult the removal of the anode from the fitting. Sealing is also enhanced in the embodiment of FIG. 4 as the covering 48" is caused to be compressed radially inwardly into engagement with the electrode.

ADVANTAGES OF THE INVENTION

As will now be apparent, a primary advantage of this invention is the fact that manufacture and completion of the fitting itself may be accomplished prior to joining the anode to the fitting. Thus, in utilizing the teaching of this invention, a water heater manufacturer may, at its option, manufacture the complete anode-fitting assembly after securing suitable fittings and anodes from suppliers of its choice. The necessity of procuring the entire assembly from one source has thus been eliminated. In addition, the necessity of molding the anode into the fitting has been eliminated. Utilizing the principles of this invention, the fitting manufacturer can provide the basic fitting itself without the necessity of joining the electrode to such fitting. Similarly, an electrode supplier can provide those elements which it is most capable of supplying, i.e., the electrode, without the necessity of manufacturing a fitting.

Several significant features of the invention should be emphasized at this time.

The tubular intermediate member 26 physically separates and insulates the external surface of the electrode 36 from the external surface of the connector member 22. This separation is enhanced by an impervious electrically insulating covering 48 rendering the external surface of the tubular intermediate member 26 electrically insulated and impervious to electrolytic action. Other elements of the fitting are similarly rendered impervious to electrolytic action.

The electrical connection between the electrode 36 and the connector member 22 is accomplished entirely out of contact with the electrolytic solution in the water tank. Electrical contact between the tubular intermediate member and a core wire of the electrode is made inside the recess 58 which itself is sealed from electrolytic fluid. The entire connector member 22 is, in fact, disposed substantially above the liquid level of the water in the water tank. Furthermore, flash 50 serves to seal the interface of the member 22, 26. The internal passageway 52 is rendered impervious to electrolytic action through the cooperation of the lining 28 and the bottom wall 56.

The tubular intermediate member 26 serves as a conventional conduit for the flow of fluid from the water heater in the event it is desired to utilize the anode-fitting assembly of this invention in combination with either an outlet for a water heater or a relief valve or for both functions.

It should be emphasized that whereas the embodiment of FIG. 2 is directed to an anode-fitting assembly which includes a water outlet, this invention is in its broadest form is directed to anode-fitting assembly wherein a tubular intermediate member is utilized to substantially separate the electrode from the water heater connector member and wherein the electrode may be releasably attached to the fitting member. While it is considered convenient to utilize the tubular intermediate member as a fluid passageway as is shown in FIG. 2, this invention should not be considered limited to a fluid passageway in combination with an anode fitting.

While, from a manufacturing standpoint, it is desirable to fabricate the fitting from a connector member and a tubular intermediate member, one-piece structures including a nipple with a tubular extension at one end thereof should be considered within the spirit of this invention.

The choice of materials of the various elements comprising the anode-fitting assembly of this invention may vary depending upon particular requirements. Since water heaters, water tanks, and pipelines are usually constructed of ferrous metal, the electrode material may be selected from a group including, but not limited to, more active electrochemical metals such as magnesium, aluminum and zinc. Similarly, core wire in the electrode, if present, may be manufactured of several metals with steel being preferred. Tubular intermediate member 26 of the preferred embodiment is fabricated of steel although other metals may be used. Similarly, the connector member 22 may be fabricated from one of several metals with steel being preferred. The particular choice of material in each case would depend upon many factors including the characteristic of the metal to be protected. Since water tanks and water heaters are generally fabricated from steel sheet it is preferred that the connector member 22, tubular intermediate member 26 and the core wire be similarly fabricated from steel. The lining 28 and covering 48 may be fabricated from any suitable impervious electrically insulating material such as polypropylene. As has previously been noted the preferred embodiment utilizes polypropylene compound No. 6652 of Hercules Incorporated.

MODIFICATIONS OF THE INVENTION

In each of the embodiments of FIGS. 2, 3 and 4 the locking recess in the anode is defined by a relationship of the joining member to the anode end such that the plane of the exterior surface of the joining member extends outwardly from the plane of the anode. Thus the joining member defines a shoulder in front of which either metal or plastic is displaced in order to establish interference.

Within the spirit of this invention should be considered structures in which the locking recess or locking shoulder is defined within the plane of the exterior surface of the joining member or in the plane of the anode end or in the plane of a portion of both of these elements.

While in the embodiments of FIGS. 2 and 3 the metal that is displaced into the locking recess is parent metal of the tubular intermediate member, it should be recognized that separate locking detents such as pins, tabs, balls, etc. may be utilized.

What is claimed is:

1. An anode-fitting assembly for a water heater or the like comprising in combination:
    a fitting member adapted to be secured to the wall of such water heater in electrical contact therewith, said fitting member having an interior cylindrical wall defining a recess at one end thereof;
    an anode member comprising:
        an electrode;
        a joining member received about one end of said electrode;
        locking recess means defined in said anode member;
        said joining member and said one end of said electrode being disposed in said recess of said fitting member;
        said joining member having a cylindrical portion the inner wall of which is in physical and electrical contact with the exterior surface of said electrode and the exterior wall of which is in physical and electrical contact with at least a portion of said interior cylindrical wall defining said recess of said fitting member, said cylindrical portion being entirely received within said recess of said fitting member and, in a radial direction, being located between said electrode and said fitting member providing an electrical interconnection between said electrode and said fitting member;
        said fitting member having a locking portion disposed essentially adjacent said locking recess means of said anode member, a part of said locking portion being disposed in said locking recess means thus to provide for locking of said anode member to said fitting member.

2. The invention of claim 1 in which said fitting member is defined by:
    a connector member adapted to be secured to the wall of such water heater in electrical contact therewith and having means at its outer end for the attachment of a water line;
    a first fluid passageway in said connector member;
    an intermediate member extending from said connector member in electrical contact therewith, said intermediate member having a recess in one end thereof defined by an interior cylindrical wall;
    a second fluid passageway in said intermediate member in communication with said first fluid passageway;
    a third fluid passageway providing communication from the exterior surface of said intermediate member to said second fluid passageway;
    electrically insulating and impervious lining means in said first, second and third passageways;
    electrically insulating and impervious covering means on the exterior surface of said intermediate member.

3. The invention of claim 1 in which said interior cylindrical wall as a free end extending therefrom disposed in said locking recess means, said free end defining said locking portion.

4. The invention of claim 1 in which said interior cylindrical wall has a folded portion extending therefrom at least a part of which is received within said locking recess means, said folded portion defining said locking portion.

5. An anode-fitting assembly for a water heater or the like comprising in combination:
    a fitting member adapted to be secured to the wall of such water heater in electrical contact therewith, said fitting member having an interior cylindrical wall defining a recess at one end thereof,
    an anode member comprising:

an electrode;

a joining member received about one end of said electrode;

said joining member and said one end of said electrode being disposed in said recess of said fitting member;

said joining member having a cylindrical portion the inner wall of which is in physical and electrical contact with the exterior surface of said electrode and the exterior wall of which is in physical and electrical contact with at least a portion of said cylindrical wall defining said recess of said fitting member, said cylindrical portion being entirely received within said recess of said fitting member and, in a radial direction, being located between said electrode and said fitting member providing an electrical interconnection between said electrode and said fitting member;

said joining member having a cross-sectional dimension greater than the cross-sectional dimension of said one end of said electrode there being thus defined locking recess means at said anode member adjacent said joining member;

said fitting member having a locking portion disposed substantially adjacent said locking recess means of said anode member, at least a part of said locking portion being disposed in said locking recess means thus to provide for locking of said anode member to said fitting member.

6. The invention of claim 5 in which said interior cylindrical wall has a free end extending therefrom at least a portion of which defines a locking portion disposed within said locking recess means.

7. The invention of claim 5 in which said interior cylindrical wall has a folded wall portion extending therefrom at least a portion of which is disposed within said locking recess means.

8. An anode-fitting assembly for a water heater or the like comprising in combination:
 a fitting member comprising:
  a connector member adapted to be secured to the wall of such water heater in electrical contact therewith and having means at its outer end for the attachment of a water line;
  a first fluid passageway in said connector member;
  an intermediate member extending from said connector member in electrical contact therewith, said intermediate member having a recess at one end thereof, at least a portion of said recess being defined by an interior cylindrical wall;
  a second fluid passageway in said intermediate member in communication with said first passageway;
  a third fluid passageway providing communication from the exterior surface of said intermediate member to said second fluid passageway;
  electrically insulating and impervious lining means in said first, second and third passageways;
  electrically insulating and impervious covering means on the exterior surface of said intermediate member;
 an anode member comprising:
  an electrode;
  a joining member received about one end of said electrode in electrical contact therewith;
  said joining member and said one end of said electrode being disposed in said recess of said intermediate member in electrical contact therewith;
  said joining member having a cylindrical portion the inner wall of which is in physical and electrical press fit contact with the exterior surface of said electrode and the exterior wall of which is in physical and electrical press fit contact with at least a portion of the said interior cylindrical wall of said intermediate member, said cylindrical portion being entirely received within said recess of said fitting member and, in a radial direction, being located between said electrode and said fitting member providing an electrical interconnection between said electrode and said fitting member;
  said joining member having a cross-sectional dimension greater than the cross-sectional dimension of said one end of said electrode there being thus provided an annular space defining locking recess means at said anode member adjacent said joining member;
  said interior cylindrical wall of said intermediate member being provided at the end thereof with an essentially annular inwardly directed locking portion at least a part of which is disposed in said locking recess means.

* * * * *